United States Patent
Lasher et al.

(10) Patent No.: US 8,078,297 B2
(45) Date of Patent: Dec. 13, 2011

(54) INTERFACE FOR RETROFITTING A MANUALLY CONTROLLED MACHINE FOR AUTOMATIC CONTROL

(75) Inventors: Vincent Lansing Lasher, West Milton, OH (US); Richard Paul Piekutowski, Huber Heights, OH (US); James Thomas Zalusky, Beavercreek, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 1364 days.

(21) Appl. No.: 11/607,800

(22) Filed: Dec. 1, 2006

(65) Prior Publication Data
US 2008/0133062 A1 Jun. 5, 2008

(51) Int. Cl.
| | |
|---|---|
| G05B 15/00 | (2006.01) |
| G05D 1/02 | (2006.01) |
| E02F 5/04 | (2006.01) |
| E02F 3/00 | (2006.01) |
| G06F 7/70 | (2006.01) |
| G01C 21/00 | (2006.01) |
| B65H 1/00 | (2006.01) |
| B65F 9/00 | (2006.01) |
| B65G 1/00 | (2006.01) |
| G01C 15/00 | (2006.01) |

(52) U.S. Cl. ............... 700/85; 37/348; 37/352; 37/382; 701/50; 701/207; 701/213; 414/222.02; 414/370; 414/323; 33/286; 172/779

(58) Field of Classification Search .................... 37/348, 37/352–362, 382; 701/50, 207, 213; 414/222.02, 414/270, 323, 148; 33/286; 172/779; 700/85
See application file for complete search history.

(56) References Cited

U.S. PATENT DOCUMENTS
5,535,532 A * 7/1996 Fujii et al. ........................ 37/348
(Continued)

FOREIGN PATENT DOCUMENTS
EP 1580063 A1 9/2005
(Continued)

OTHER PUBLICATIONS

Seelinger et al., Automatic visual guidance for a forklift engaging a pallet, Robotics and Autonomous Systems, 2005.*

(Continued)

*Primary Examiner* — Ramesh Patel
*Assistant Examiner* — Darrin Dunn
(74) *Attorney, Agent, or Firm* — Dinsmore & Shohl LLP

(57) ABSTRACT

An operator controllable machine is retrofitted to be operator controlled or to be automatically controlled. An electrical joystick output is provided by a manually actuated joystick control, including a joystick, to a machine control in the manually controlled machine. An interface is added between the joystick control and the machine control to permit an external source, such as a GPS receiver or a laser receiver, to apply an electrical automatic control output to the machine control, as well. The interface includes a number of optical isolation circuits and a microprocessor. The isolated microprocessor output is supplied to the machine control, which produces valve control signals to control the hydraulic valves of the machine. The application of hydraulic fluid to the hydraulic cylinders of the machine is then controlled by either the joystick control output or the automatic control output. In an intermediate range of joystick movement, the hydraulic cylinders of the machine are controlled by both outputs, resulting in a smooth transition between manual and automatic operation.

27 Claims, 3 Drawing Sheets

U.S. PATENT DOCUMENTS

| | | | | |
|---|---|---|---|---|
| 5,559,725 | A * | 9/1996 | Nielson et al. | 700/302 |
| 5,704,142 | A | 1/1998 | Stump | |
| 5,793,125 | A * | 8/1998 | Tarng | 307/117 |
| 5,956,250 | A * | 9/1999 | Gudat et al. | 701/26 |
| 6,131,062 | A * | 10/2000 | Nielsen | 701/50 |
| 6,181,999 | B1 * | 1/2001 | Yamamoto et al. | 701/50 |
| 6,246,939 | B1 * | 6/2001 | Nozawa | 701/50 |
| 6,364,028 | B1 * | 4/2002 | Ferrell et al. | 172/1 |
| 6,523,636 | B2 * | 2/2003 | Chatterjea | 180/333 |
| 6,539,303 | B2 * | 3/2003 | McClure et al. | 701/213 |
| 6,550,562 | B2 * | 4/2003 | Brandt et al. | 180/333 |
| 6,718,245 | B2 * | 4/2004 | Watanabe et al. | 701/50 |
| 6,782,644 | B2 * | 8/2004 | Fujishima et al. | 37/348 |
| 6,923,285 | B1 * | 8/2005 | Rossow et al. | 180/272 |
| 6,954,999 | B1 | 10/2005 | Richardson et al. | |
| 7,142,956 | B2 * | 11/2006 | Heiniger et al. | 701/23 |
| 7,628,239 | B1 * | 12/2009 | Louie et al. | 180/167 |
| 2001/0056319 | A1 * | 12/2001 | Rocke | 701/50 |
| 2002/0130765 | A1 * | 9/2002 | Flick | 340/7.2 |
| 2002/0198654 | A1 * | 12/2002 | Lange et al. | 701/213 |
| 2003/0006048 | A1 * | 1/2003 | Marriott et al. | 172/4.5 |
| 2003/0105891 | A1 | 6/2003 | Moriyama | |
| 2003/0111268 | A1 * | 6/2003 | Alft et al. | 175/73 |
| 2003/0147727 | A1 * | 8/2003 | Fujishima et al. | 414/200 |
| 2005/0209759 | A1 * | 9/2005 | Lee | 701/50 |
| 2006/0084419 | A1 * | 4/2006 | Rocamora et al. | 455/419 |
| 2006/0137931 | A1 * | 6/2006 | Berg et al. | 180/333 |
| 2006/0237958 | A1 * | 10/2006 | Dix et al. | 280/764.1 |
| 2007/0056780 | A1 * | 3/2007 | Jaenke et al. | 180/65.1 |
| 2007/0107240 | A1 * | 5/2007 | Piekutowski | 33/286 |
| 2007/0227136 | A1 * | 10/2007 | Pfaff | 60/422 |
| 2007/0284121 | A1 * | 12/2007 | Montgomery et al. | 172/2 |
| 2007/0291130 | A1 * | 12/2007 | Broggi et al. | 348/218.1 |
| 2008/0087447 | A1 * | 4/2008 | Piekutowski | 172/3 |
| 2009/0099710 | A1 * | 4/2009 | Takach, Jr. | 701/2 |
| 2009/0323257 | A1 * | 12/2009 | Sarid et al. | 361/631 |

FOREIGN PATENT DOCUMENTS

| | | | |
|---|---|---|---|
| JP | 60218102 A | | 10/1985 |
| JP | 2003029922 A | * | 1/2003 |
| WO | 9109275 A2 | | 6/1991 |

OTHER PUBLICATIONS

Dolan et al., an Autonomous Ground Vehicle for Distributed Surveillance: Cyberscout, Carnegie Mellon Univeristy, 1999.*

International Search Report and Written Opinion dated Apr. 21, 2008 pertaining to International application No. PCT/US2007/085587.

International Preliminary Report on Patentability dated Jun. 11, 2009 pertaining to International application No. PCT/US2007/085587.

* cited by examiner

INTERFACE FOR RETROFITTING A MANUALLY CONTROLLED MACHINE FOR AUTOMATIC CONTROL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to an electrical interface and, more particularly, to an electrical interface that permits a machine, having a manually actuated joystick control, to be retrofitted for automatic control.

Various types of machines, such as earth moving equipment, are commonly manufactured and sold with controls, such as joystick controls, that provide for manual control of some machine functions. Some machines may also include a provision for automatic control of various machine functions. For example, the position of a machine or an element of the machine, such as a cutting blade or bucket, may be automatically controlled by reference to a positional reference such as the output of a global positioning system (GPS) receiver, or a laser receiver that detects reference beams of laser light. However, many machines are sold without a provision for automatic control, and it is common for the owner of such a machine to retrofit it so that it can be controlled automatically. Machines of this type typically have hydraulic cylinders that move or reorient the various machine elements, either directly or through mechanical linkages. The application of hydraulic fluid to these cylinders is controlled by valves that are typically electrically actuated. The electrical control signals that control valve actuation are provided by a machine control, which includes appropriate circuitry and microprocessors, and operates under the control of one or more joystick devices.

In the past, when a manually controlled machine was retrofitted for automatic control, the automatic control system was usually added to the machine control system by tapping into the hydraulic lines that supply hydraulic fluid to the cylinders. The hydraulic lines are typically reworked for this purpose so that hydraulic fluid can be supplied to the cylinders from either the manual control system or the automatic control system. While the resulting modified hydraulic system typically functions well, the retrofitting process is time consuming, and cumbersome. It is seen, therefore, that there is a need for a control arrangement for retrofitting a machine of this type in which the retrofitting process is facilitated, and the time and effort required for retrofitting are reduced.

SUMMARY OF THE INVENTION

This need is met by an interface according to the present invention for retrofitting for automatic control a machine of the type having a manually actuated joystick control. The joystick control includes a joystick for providing an electrical joystick output in response to the position of the joystick. The machine includes a machine control, retrofitted to be responsive to the electrical joystick output. The machine control provides valve control signals to hydraulic valves to control the application of hydraulic fluid to the hydraulic cylinders. The hydraulic cylinders then move a machine element, such as a blade, to a desired position. The interface comprises a microprocessor, responsive to a number of optical isolation circuits, that provides a microprocessor output. The interface includes at least one optical isolation circuit for isolating the electrical joystick output, and providing an isolated electrical joystick output to the microprocessor, and at least one optical isolation circuit for isolating an electrical automatic control output from an external source, and providing an isolated electrical automatic control output to the microprocessor. The interface further includes at least one optical isolation circuit, responsive to the microprocessor output, for providing an isolated microprocessor output to the machine control. As a result, the application of hydraulic fluid to the hydraulic cylinders may be controlled by either the joystick control output or the automatic control output.

The at least one optical isolation circuit for isolating the electrical joystick output may comprise a pair of electrical optical isolation circuits for isolating the electrical joystick output, and providing multiple isolated electrical joystick outputs. The electrical joystick output may comprise one or more ratiometric voltages. The at least one optical isolation circuit for isolating an electrical automatic control output from an external source, and providing an isolated electrical automatic control output, may comprise an optical isolation circuit for receiving a pulse width modulated electrical automatic control output and providing an isolated electrical automatic control output. The at least one optical isolation circuit, responsive to the microprocessor output for providing an isolated microprocessor output to the machine control, may provide an isolated pulse width modulated microprocessor output.

The at least one optical isolation circuit for isolating an electrical automatic control output from an external source, and providing an isolated electrical automatic control output, may comprise an optical isolation circuit for receiving a serial digital automatic control output from an external source and for providing an isolated serial digital automatic control output. The interface may further comprise an electrically isolated power and ground for each of the optical isolation circuits.

The microprocessor may provide a microprocessor output which is dependent only on the isolated electrical automatic control output when the isolated electrical joystick output is less than a first certain value. Further, the microprocessor may provide a microprocessor output which is dependent only upon the isolated electrical joystick output when the isolated electrical joystick output is greater than a second certain value. Finally, the microprocessor may provide a microprocessor output which is dependent upon both the isolated electrical automatic control output and the isolated electrical joystick output when the isolated electrical joystick output is both greater than a first certain value, and less than a second certain value.

Accordingly, it is an object of the present invention to provide for retrofitting an operator controllable machine so that it can be automatically controlled; to provide such a machine in which retrofitting is accomplished by interposing an interface between a joystick control and the machine control to permit the introduction of an electrical automatic control output; and to provide such a machine in which the transition between manual control and automatic control is effected smoothly.

DETAILED DESCRIPTION OF THE PREFERRED EMBODIMENT

Figure 1:
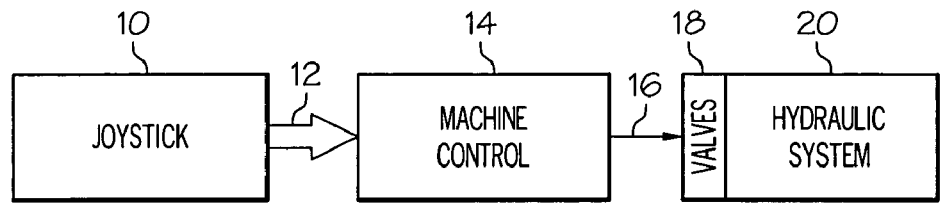
FIG. 1 is a schematic representation of a prior art control system of a conventional machine.

Reference is made to FIG. 1 of the drawings which shows schematically part of a manual control system for an earth moving machine, such as for example, a bulldozer, motor-grader, or excavator. The machine includes a manually actuated joystick control, including a joystick 10. The joystick control provides an electrical joystick output 12 in response to the position of the joystick 10. A machine control 14 is responsive to the electrical joystick output 12 and provides valve control signals 16 in response thereto. The joystick output 12 typically is made up of a number of analog direct current outputs. The joystick may, for example, provide a pair of outputs, one such output proportional to the lateral, side-to-side movement of the joystick, and the other output proportional to the forward-and-back movement of the joystick. These outputs are typically used to control a pair of machine functions, such as for example the raising and lowering of a cutting blade and the tilting of the cutting blade side-to-side. The machine control 14 receives the joystick output 12 in pulse width modulated format, or d.c. analog format, and supplies it to the hydraulic valves 18 in a form needed by the valves. The appropriate flow of hydraulic fluid is then supplied to the hydraulic system 20 to effect movement of the hydraulic cylinders in a desired manner, and corresponding movement of the machine element.

Figure 2:
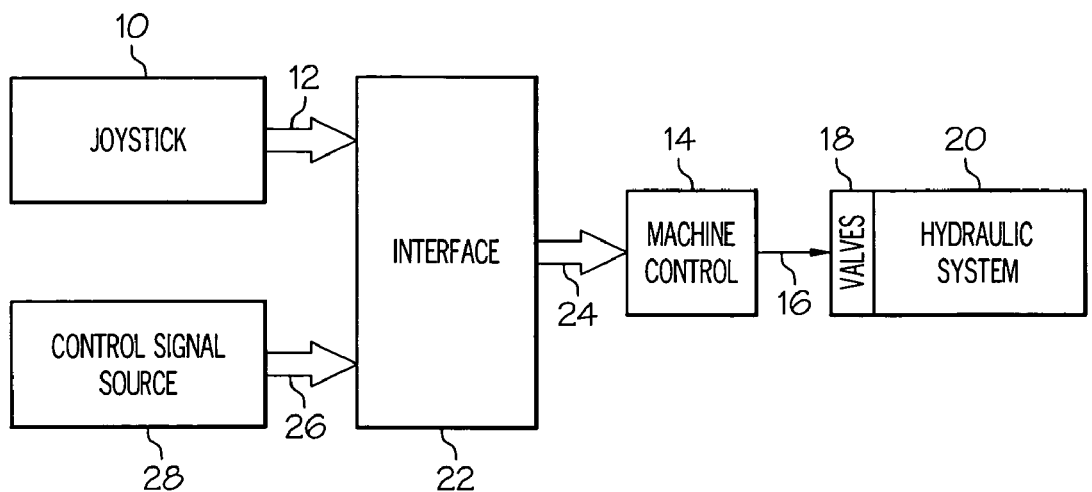
FIG. 2. is a schematic representation of the control system of a machine with the interface of the present invention added.
Figure 3:
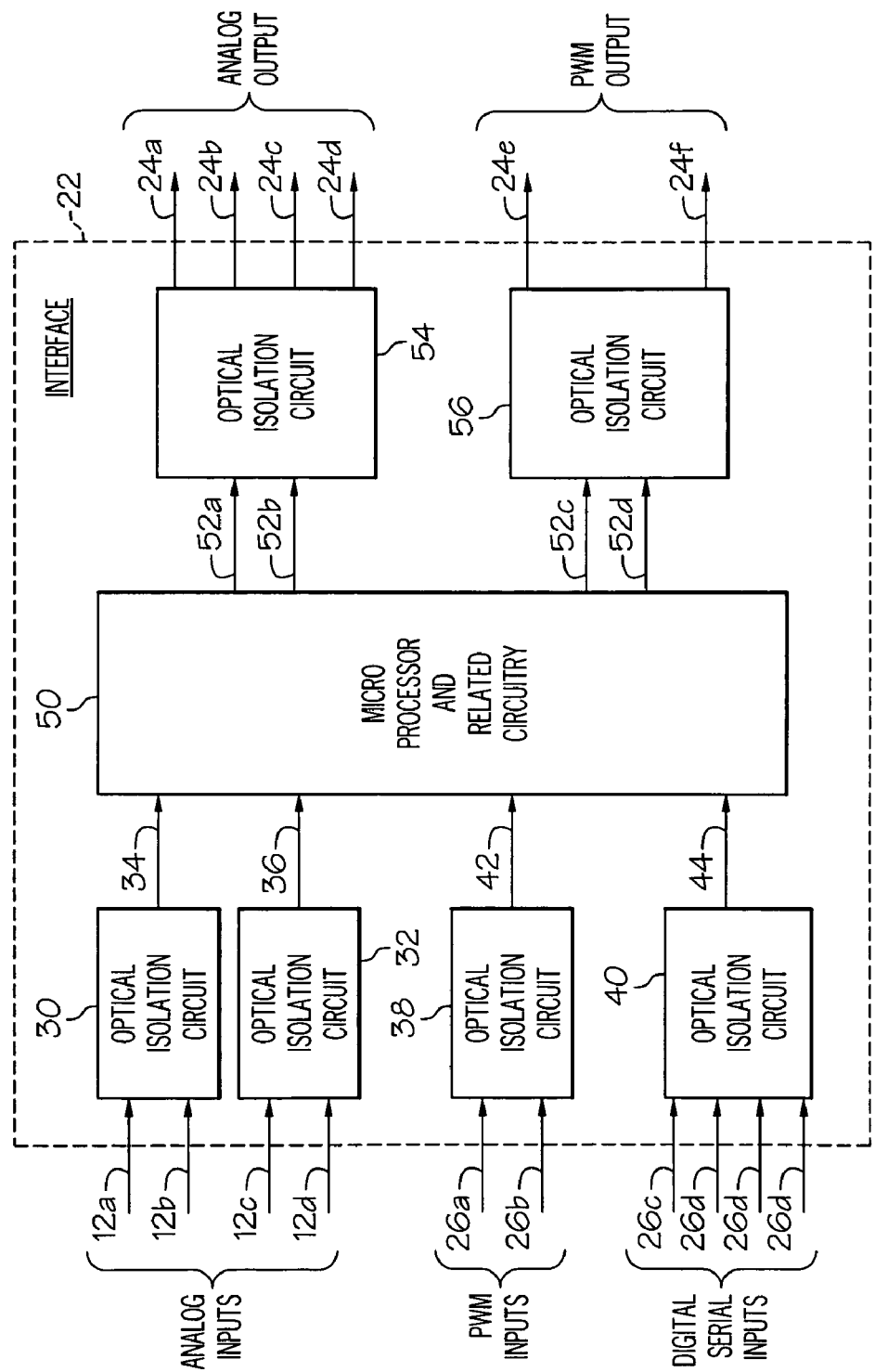
FIG. 3 is a more detailed schematic representation of the interface of the present invention.

Reference is now made to FIG. 2 of the drawings, which illustrates the addition of the interface 22 into the system of FIG. 1. Note that the interface 22 is inserted between the manually actuated joystick control, including joystick 10 and the machine control 14 that supplies the valve control signals to the electrically actuated hydraulic valves 18. As will become apparent, the valves 18 are responsive to the valve control signals, and control the application of hydraulic fluid to the hydraulic cylinders 20. The interface 22 includes a microprocessor which generates an isolated microprocessor output 24 in response to the electrical joystick control output 12 or the automatic control output 26 from an external source 28. The external source 28 may be any of a number of sources of position information, such as for example a GPS receiver, a laser detector paired with a laser transmitter, or an automated or robotic total station. The application of hydraulic fluid to the hydraulic cylinders is controlled by the automatic control output 24 which, in turn, is controlled by the joystick output 12 or the control signal source output 26, or both, depending upon whether the interface is switched to automatic or manual control. A manually actuated switch mechanism may be provided on the interface 22 for this purpose if desired. As will be explained more fully below, however, the interface may always be left in an automatic mode, with the joystick 10 being used only as an override.

The interface 22 includes at least one optical isolation circuit 30, and preferably a pair of optical isolation circuits 30 and 32, for isolating the electrical joystick output, and providing multiple isolated electrical joystick outputs 34 and 36. The electrical joystick outputs on 12a-12d may be ratiometric voltages. For example, one output may be the ratio of outputs 12a and 12b, while another output is the ratio of outputs 12c and 12d. The interface 22 further includes at least one optical isolation circuit 38, and preferably a pair of optical isolation circuits 38 and 40, for isolating an electrical automatic control output, received on 26a, 26b, 26c, 26d, 26e, and 26f from an external source, and providing an isolated electrical automatic control output 42 or 44. Optical isolation circuit 38 is arranged to accept pulse width modulated electrical automatic control outputs on 26a and 26b, and optical isolation circuit 40 is arranged to accept serial digital automatic control outputs on 26c, 26d, 26e, and 26f. Typically, the pulse width modulated inputs and digital serial inputs on line 26a-26f will not be utilized simultaneously in one retrofitted machine. Rather, depending upon the type of output supplied by the external device being used, and the type of input required by the machine control being retrofitted, only the pulse width modulated inputs or only the digital serial inputs will be used in any retrofit configuration for receipt of outputs from an external device. It is possible that a joystick may provide pulse width modulated outputs and that such PWM outputs may be applied to the microprocessor 50 through optical isolation circuit 38. With such an arrangement, all inputs 26a-26f would be used simultaneously.

The interface 22 includes a microprocessor 50 that is responsive to the isolated electrical joystick output 34, 36 and to the isolated electrical automatic control output 42 or 44, for providing a microprocessor output 52a, 52b, 52c, and 52d. The interface 22 also includes at least one optical isolation circuit 54, and preferably two optical isolation circuits 54 and 56, responsive to the microprocessor output 52, for providing isolated microprocessor outputs 24a, 24b, 24c, 24d, 24e and 24f to the machine control 14. Outputs 24a-24d are isolated analog outputs, whereas outputs 24e and 24f are isolated pulse width modulated outputs. Outputs 24a-24f are selected for use, based on the type of input needed by the machine control 14 of the earthmoving machine being retrofitted. It will be apparent that the interface of the present invention permits the application of hydraulic fluid to the hydraulic cylinders 20 to be controlled by either the joystick control output 12, or the automatic control output 26.

Figure 4:
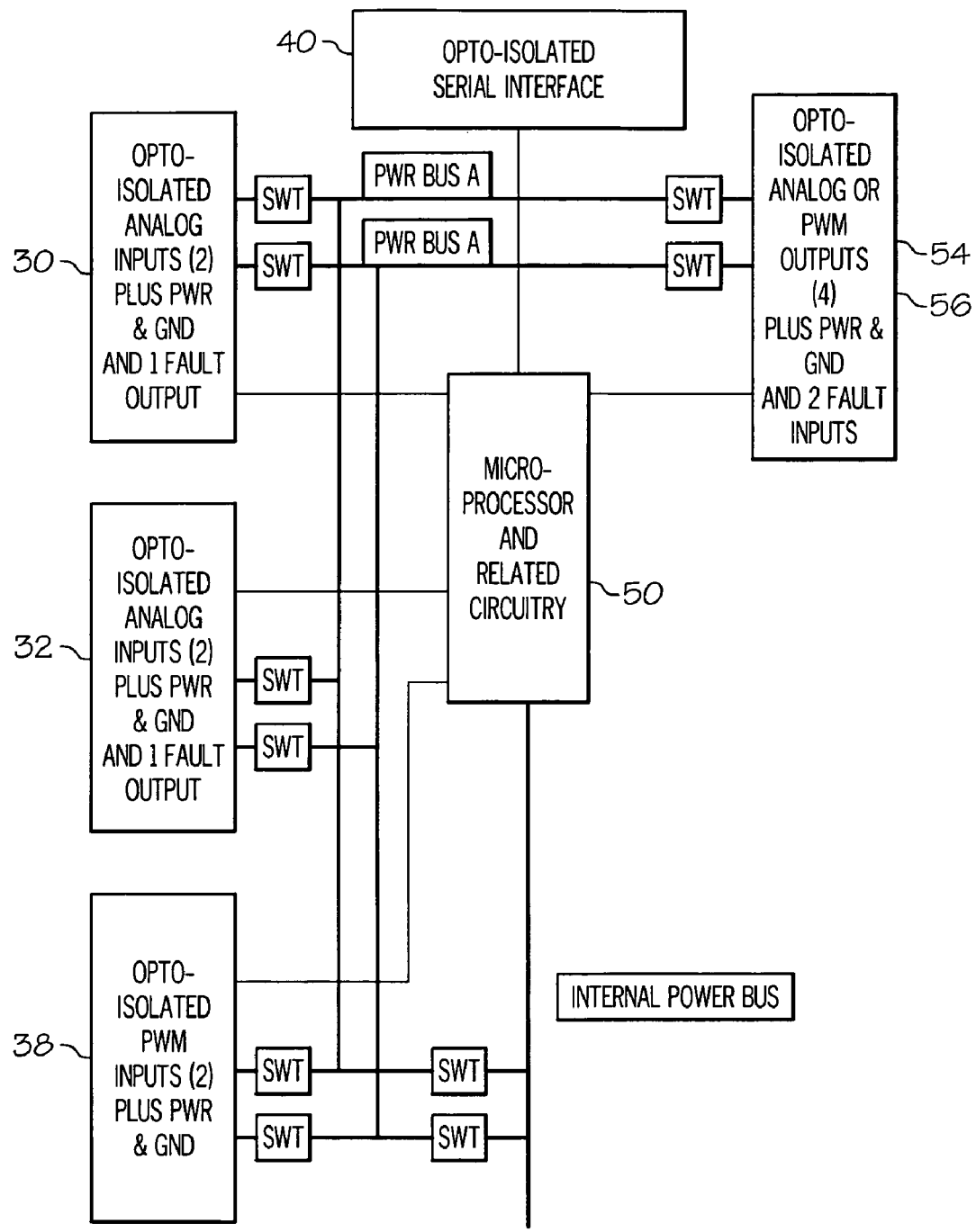
FIG. 4 is a further schematic representation of the interface of the present invention.

FIG. 4 shows the power isolation arrangement implemented in the interface of the present invention. A pair of power buses A and B provide power to the various interface elements. The inputs and outputs of the isolation circuits 30, 32, 38, 40, 54, and 56, and the microprocessor 50 are isolated, as described above, as well as the power supplied for each of these circuits. Further, electrically isolated ground connections are provided for each of the isolation circuits 30, 32, 40, 54 and 56. It is desired that excessive current flows across the interface 22 be prevented, and the isolation of power and ground for each of these units accomplishes this.

Retrofitting an existing earth moving machine for automatic control with the interface of the present invention is a straightforward process. The microprocessor 50 will have previously been programmed to receive the specific output signal levels and types provided by the joystick 10 of the machine that is being retrofitted and the control source 28 that is being added to the machine. Further, the microprocessor 50 will have been programmed to provide the specific output signal levels and types required by the machine control 14 of the machine that is being retrofitted. The lines 12 are then disconnected from the machine control and connected to the interface input. The GPS receiver or other external control sign source is connected to the interface 50 and the output of the interface 50 is connected to the input of the machine control 14, completing the retrofitting process.

While the interface 22 may be switched to be responsive only to the joystick 10 or only to the control signal source 28, the interface may advantageously be switched so that it is continuously responsive to both outputs 12 and 26, effectively blending them together to control the machine element. With this arrangement, the microprocessor 22 provides a microprocessor output 24 which is dependent only upon the isolated electrical automatic control output 42, 44 when the isolated electrical joystick output 34, 36 is less than a first certain value. Similarly, the microprocessor 22 operates to provide a microprocessor output 24 which is dependent only upon the isolated electrical joystick output 34, 36 when the isolated electrical joystick output 34, 36 is greater than a second certain value. Finally, the microprocessor 22 operates to provide a microprocessor output 24 which is dependent upon both the isolated electrical automatic control output 42, 44 and the isolated electrical joystick output 34, 36 when the isolated electrical joystick output 34, 36 is both greater than a first certain value, and less than a second certain value. The specific first and second values are chosen with the operating characteristics of the specific machine control 14 on the machine being retrofitted It will be appreciated that when the system is set to respond to both the joystick 10 and the control signal source 28, it will operate in an automatic mode for extended periods. When the joystick is moved away from neutral by a slight amount such that the output 34, 36 is less than the first certain value, the microprocessor 22 ignores the output 34, 36. When the joystick is moved further away from neutral such that the isolated electrical joystick output 34, 36 is both greater than a first certain value, and less than a second certain value, then the microprocessor 22 operates to provide a microprocessor output 24 which is dependent upon both the isolated electrical automatic control output 42, 44 and the isolated electrical joystick output 34, 36. Finally, when the joystick is moved even further away from neutral such that the isolated electrical joystick output 34, 36 is greater than a second certain value, the microprocessor 22 operates to provide a microprocessor output 24 which is dependent only upon the isolated electrical joystick output 34, 36. It will be appreciated that this arrangement smoothes the transition from automatic to manual control, and also permits the operator to override the automatic system quickly in the event that circumstances require a rapid change.

Although the present invention has been described in terms of the presently preferred embodiments, it is to be understood that the disclosure is not to be interpreted as limiting. Accordingly, it is intended that the appended claims be interpreted as covering all alterations and modifications which fall within the true spirit and scope of the invention.

What is claimed is:

1. An interface for retrofitting for automatic control a machine of the type having a manually actuated joystick control, including a joystick, for providing an electrical joystick output in response to a position of the joystick; a machine control, responsive to the electrical joystick output, for providing valve control signals; hydraulic cylinders for moving a machine element; and hydraulic valves, responsive to said valve control signals, for controlling an application of hydraulic fluid to said hydraulic cylinders; comprising:

at least one optical isolation circuit for isolating said electrical joystick output, and providing an isolated electrical joystick output, at least one optical isolation circuit for isolating an electrical automatic control output from an external source, and providing an isolated electrical automatic control output, said at least one optical isolation circuit for isolating an electrical automatic control output from an external source comprises an optical isolation circuit for receiving a pulse width modulated electrical automatic control output and providing an isolated electrical automatic control output, and an optical isolation circuit for receiving a serial digital automatic control output from an external source and providing an isolated serial digital automatic control output, a microprocessor, responsive to said isolated electrical joystick output and to said isolated electrical automatic control output, for providing a microprocessor output, said microprocessor being switchable between at least two modes of operation, a first mode in which the application of hydraulic fluid to said hydraulic cylinders is controlled by said joystick control output, and a second, automatic mode in which the application of hydraulic fluid to said hydraulic cylinders is controlled by both said joystick control output and said automatic control output, and at least one optical isolation circuit, responsive to said microprocessor output, for providing an isolated microprocessor output to said machine control, whereby the application of hydraulic fluid to said hydraulic cylinders may be controlled by either said joystick control output or said automatic control output.

2. The interface of claim 1 in which said at least one optical isolation circuit for isolating said electrical joystick output comprises a pair of electrical optical isolation circuits for isolating said electrical joystick output, and providing multiple isolated electrical joystick outputs.

3. The interface of claim 1 in which said electrical joystick output comprises one or more ratiometric voltages.

4. The interface of claim 1 in which said at least one optical isolation circuit, responsive to said microprocessor output, for providing an isolated microprocessor output to said machine control comprises an optical isolation circuit, responsive to said microprocessor output, for providing an isolated pulse width modulated microprocessor output to said machine control.

5. The interface of claim 1 further comprising electrically isolated power and ground for each of said optical isolation circuits.

6. The interface of claim 1 in which said microprocessor, when switched in said second, automatic mode, operates to provide a microprocessor output which is dependent only upon said isolated electrical automatic control output when said isolated electrical joystick output is less than a first certain value.

7. The interface of claim 1 in which said microprocessor, when switched in said second, automatic mode, operates to provide a microprocessor output which is dependent only upon said isolated electrical joystick output when said isolated electrical joystick output is greater than a second certain value.

8. The interface of claim 1 in which said microprocessor, when switched in said, second automatic mode, operates to provide a microprocessor output which is dependent upon both said isolated electrical automatic control output and said isolated electrical joystick output when said isolated electrical joystick output is both greater than a first certain value, and less than a second certain value.

9. The interface of claim 1 in which said at least one optical isolation circuit for isolating said electrical joystick output comprises an optical isolation circuit for receiving a pulse width modulated electrical joystick output.

10. The interface of claim 1 in which said at least one optical isolation circuit, responsive to said microprocessor output, for providing an isolated microprocessor output to said machine control comprises an optical isolation circuit, responsive to said microprocessor output, for providing an isolated analog microprocessor output to said machine control.

11. The interface of claim 1 in which said microprocessor is switchable to a third mode of operation in which the application of hydraulic fluid to said hydraulic cylinders is controlled by said automatic control output.

12. An operator controllable machine which has been retrofitted to be operator controlled or to be automatically controlled, comprising:
   a manually actuated joystick control, including a joystick, for providing an electrical joystick output in response to a position of the joystick,
   an external source for providing an electrical automatic control output, at least one optical isolation circuit, responsive to said electrical joystick output, for isolating said electrical joystick output, and providing an isolated electrical joystick output,
   at least one optical isolation circuit for isolating an electrical automatic control output from said external source, and providing an isolated electrical automatic control output,
   a microprocessor, responsive to said isolated electrical joystick output and to said isolated electrical automatic control output, for providing a microprocessor output,
   at least one optical isolation circuit, responsive to said microprocessor output, for providing an isolated microprocessor output, said at least one optical isolation circuit, responsive to said microprocessor output, for providing an isolated microprocessor output comprising an optical isolation circuit, responsive to said microprocessor output, for providing an isolated pulse width modulated microprocessor output, and an optical isolation circuit, responsive to said microprocessor output, for providing an isolated analog microprocessor output,
   a machine control, responsive to said isolated microprocessor output, for providing valve control signals, hydraulic cylinders for moving a machine element, and
   hydraulic valves, responsive to said valve control signals, for controlling the application of hydraulic fluid to said hydraulic cylinders,
   said microprocessor being switchable between at least two modes of operation, a first mode in which the application of hydraulic fluid to said hydraulic cylinders is controlled by said joystick control output, and a second, automatic mode in which the application of hydraulic fluid to said hydraulic cylinders is controlled by both said joystick control output and said automatic control output, whereby the application of hydraulic fluid to said hydraulic cylinders may be controlled by either said joystick control output or said automatic control output.

13. The operator controllable machine of claim 12, in which said at least one optical isolation circuit for isolating said electrical joystick output comprises a pair of electrical optical isolation circuits for isolating said electrical joystick output, and providing multiple isolated electrical joystick outputs.

14. The operator controllable machine of claim 12 in which said electrical joystick output comprises one or more ratiometric voltages.

15. The operator controllable machine of claim 12 in which said at least one optical isolation circuit for isolating an electrical automatic control output from an external source, and providing an isolated electrical automatic control output, comprises an optical isolation circuit for receiving a pulse width modulated electrical automatic control output and providing an isolated electrical automatic control output.

16. The operator controllable machine of claim 12 in which said at least one optical isolation circuit for isolating an electrical automatic control output from an external source, and providing an isolated electrical automatic control output, comprises an optical isolation circuit for receiving a serial digital automatic control output from an external source and providing an isolated serial digital automatic control output.

17. The operator controllable machine of claim 12 further comprising electrically isolated power and ground for each of said optical isolation circuits.

18. The operator controllable machine of claim 12 in which said microprocessor, when switched in said second, automatic mode, operates to provide a microprocessor output which is dependent only upon said isolated electrical automatic control output when said isolated electrical joystick output is less than a first certain value.

19. The operator controllable machine of claim 12 in which said microprocessor, when switched in said second, automatic mode, operates to provide a microprocessor output which is dependent only upon said isolated electrical joystick output when said isolated electrical joystick output is greater than a second certain value.

20. The operator controllable machine of claim 12 in which said microprocessor, when switched in said second, automatic mode, operates to provide a microprocessor output which is dependent upon both said isolated electrical automatic control output and said isolated electrical joystick output when said isolated electrical joystick output is both greater than a first certain value, and less than a second certain value.

21. The operator controllable machine of claim 12 in which said at least one optical isolation circuit for isolating said electrical joystick output comprises an optical isolation circuit for receiving a pulse width modulated electrical joystick output.

22. The operator controllable machine of claim 12, in which said microprocessor is switchable to a third mode of operation in which the application of hydraulic fluid to said hydraulic cylinders is controlled by said automatic control output.

23. An interface for retrofitting for automatic control a machine of the type having a manually actuated joystick control, including a joystick, for providing an electrical joystick output in response to a position of the joystick; a machine control, responsive to the electrical joystick output, for providing valve control signals; hydraulic cylinders for moving a machine element; and hydraulic valves, responsive to said valve control signals, for controlling a application of hydraulic fluid to said hydraulic cylinders; comprising:
   at least one isolation circuit for isolating said electrical joystick output, and providing an isolated electrical joystick output,
   at least one isolation circuit for isolating an electrical automatic control output from an external source, and providing an isolated electrical automatic control output, said at least one isolation circuit including an isolation circuit for receiving pulse width modulated outputs, and an isolation circuit for receiving digital serial inputs,
   a microprocessor, responsive to said isolated electrical joystick output and to said isolated electrical automatic control output, for providing a microprocessor output, said microprocessor being switchable between at least two modes of operation, a first mode in which the application of hydraulic fluid to said hydraulic cylinders is controlled by said joystick control output, and a second, automatic mode in which the application of hydraulic fluid to said hydraulic cylinders is controlled by both said joystick control output and said automatic control output, and at least one isolation circuit, responsive to said microprocessor output, for providing an isolated microprocessor output to said machine control, said isolated microprocessor output being available as both a pulse width modulated isolated microprocessor output and an analog isolated microprocessor output, as needed by the machine being retrofitted, whereby the application of hydraulic fluid to said hydraulic position of the joystick; a machine control, responsive to the electrical joystick output, for providing valve control signals; hydraulic cylinders for moving a machine element; and hydraulic valves, responsive to said valve control signals, for controlling the application of hydraulic fluid to said hydraulic cylinders; comprising:

at least one isolation circuit for isolating said electrical joystick output, and providing an isolated electrical joystick output, at least one isolation circuit for isolating an electrical automatic control output from an external source, and providing an isolated electrical automatic control output, said at least one isolation circuit including an isolation circuit for receiving pulse width modulated outputs, and an isolation circuit for receiving digital serial inputs, a microprocessor, responsive to said isolated electrical joystick output and to said isolated electrical automatic control output, for providing a microprocessor output, said microprocessor being switchable between at least two modes of operation, a first mode in which the application of hydraulic fluid to said hydraulic cylinders is controlled by said joystick control output, and a second, automatic mode in which the application of hydraulic fluid to said hydraulic cylinders is controlled by both said joystick control output and said automatic control output, and at least one isolation circuit, responsive to said microprocessor output, for providing an isolated microprocessor output to said machine control, said isolated microprocessor output being available as both a pulse width modulated isolated microprocessor output and an analog isolated microprocessor output, as needed by the machine being retrofitted, whereby the application of hydraulic fluid to said hydraulic cylinders may be controlled by either said joystick control output or said automatic control output.

24. The interface of claim 23 in which said microprocessor, when switched in said second, automatic mode, operates to provide a microprocessor output which is dependent only upon said isolated electrical automatic control output when said isolated electrical joystick output is less than a first certain value.

25. The interface of claim 23 in which said microprocessor, when switched in said second, automatic mode, operates to provide a microprocessor output which is dependent only upon said isolated electrical joystick output when said isolated electrical joystick output is greater than a second certain value.

26. The interface of claim 23 in which said microprocessor, when switched in said second, automatic mode, operates to provide a microprocessor output which is dependent upon both said isolated electrical automatic control output and said isolated electrical joystick output when said isolated electrical joystick output is both greater than a first certain value, and less than a second certain value.

27. The interface of claim 23 in which said microprocessor is switchable to a third mode of operation in which the application of hydraulic fluid to said hydraulic cylinders is controlled by said automatic control output.

* * * * *